(12) United States Patent
Greuter et al.

(10) Patent No.: US 6,848,692 B1
(45) Date of Patent: Feb. 1, 2005

(54) HYDROPNEUMATIC SUSPENSION SYSTEM

(75) Inventors: Adolf Greuter, Ermatingen (CH);
Franz Osterwalder, Kreuzlingen (CH);
Jens Schroeter, Kreuzlingen (CH);
Bernhard Doll, Siegershausen (CH)

(73) Assignee: MOWAG Motorwagenfabrik AG, Kreuzlingen (CH)

( * ) Notice: Subject to any disclaimer, the term of this patent is extended or adjusted under 35 U.S.C. 154(b) by 27 days.

(21) Appl. No.: 10/110,549

(22) PCT Filed: Oct. 12, 2000

(86) PCT No.: PCT/EP00/10102

§ 371 (c)(1),
(2), (4) Date: Apr. 12, 2002

(87) PCT Pub. No.: WO01/26923

PCT Pub. Date: Apr. 19, 2001

(30) Foreign Application Priority Data

Oct. 12, 1999 (DE) ........................................ 199 49 152

(51) Int. Cl.⁷ .............................................. B60G 17/04
(52) U.S. Cl. .............................. 280/5.507; 280/124.159
(58) Field of Search .......................... 280/5.513, 5.515, 280/5.507, 124.159, 124.16, 124.161, 6.15, 6.159; 267/64.16, 64.17, 64.25

(56) References Cited

U.S. PATENT DOCUMENTS

| | | | | |
|---|---|---|---|---|
| 4,212,484 A | * | 7/1980 | Fujii | 280/6.152 |
| 4,593,920 A | * | 6/1986 | Natsume et al. | 280/6.157 |
| 5,020,826 A | * | 6/1991 | Stecklein et al. | 280/124.159 |
| 5,116,077 A | | 5/1992 | Karnopp et al. | 280/707 |
| 5,342,080 A | | 8/1994 | Machida | 280/708 |
| 5,458,218 A | | 10/1995 | Runkel | 188/281 |
| 5,547,211 A | * | 8/1996 | Runkel | 280/6.159 |
| 6,010,139 A | * | 1/2000 | Heyring et al. | 280/124.104 |

FOREIGN PATENT DOCUMENTS

| | | | | |
|---|---|---|---|---|
| DE | G 9103359.4 | 6/1991 | | B60G/17/04 |
| DE | 4334227 A 1 | 4/1995 | | B60G/23/00 |
| DE | 19505712 A1 | 8/1996 | | B60G/17/00 |
| FR | 2 692 846 A1 | 6/1993 | | B60G/17/04 |

* cited by examiner

*Primary Examiner*—David R. Dunn
(74) *Attorney, Agent, or Firm*—Head, Johnson & Kachigian

(57) ABSTRACT

The invention is directed toward a hydropneumatic suspension and a method involved in controlling such a hydropneumatic suspension as is used in relation to cross-country motor vehicles, which, in spite of being of a simple, inexpensive and repair-friendly structure, makes it possible to take account of both static and also dynamic factors and which in addition permits both manual and also automatic control. The hydropneumatic suspension, such as for motor vehicles, has at least two hydropneumatic springs which are in flow communication with each and also with a metering cylinder by way of a load distribution unit which is distinguished in that the load distribution unit has at least the following switching positions; flow separation of the hydropneumatic springs, flow communication only of the two connected hydropneumatic springs with each other, and flow communication of the two hydropneumatic springs and the metering cylinder with each other.

23 Claims, 2 Drawing Sheets

HYDROPNEUMATIC SUSPENSION SYSTEM

CROSS-REFERENCE TO RELATED APPLICATION

This application claims priority to PCT Application No. PCT/EP00/10102 filed 12 Oct. 2000, which claims priority to German Application No. 19949152.6 filed 12 Oct. 1999.

The invention concerns a hydropneumatic suspension or the operating procedure in controlling such a hydropneumatic suspension, as is used in particular in cross-country motor vehicles.

The travel characteristics of cross-country vehicles depend on the one hand on the static conditions involved such as for example weight and distribution of load and on the other hand dynamic factors, for example the speed of travel, the size and frequency of irregularities of the ground and so forth.

The advantage of hydropneumatic suspension is in principle that, by varying for example the volume of oil in the individual hydropneumatic springs, it is possible to vary the spring characteristics of the individual hydropneumatic springs and thus of the entire suspension system, in dependence on static and/or dynamic factors.

In this context, systems are already known which by means of a plurality of sensors continuously detect those static and dynamic parameters and by way of a complex computer set the optimum prestressing of the individual hydropneumatic springs, that is to say the oil volume thereof.

Those systems however are expensive to manufacture and, because of the large number of in particular electrical and electronic components, under rough conditions of use, for example in military situations, on the one hand are severely exposed to the risk of failure and on the other hand are not very repair-friendly as restoration in a purely mechanical fashion is generally not possible. In order to arrive at a simple hydropneumatic suspension system which is also easy to repair, it is moreover already known from DE 195 05 712 to either increase or reduce the volume of the individual hydropneumatic springs by means of a fixed additional volume, in dependence on the load condition, that is to say a static factor. That arrangement does not involve automatic adaptation nor can the size of the additional volume be changed. Adaptation of the suspension system to dynamic factors is also not possible in that fashion.

SUMMARY OF THE INVENTION

Therefore the object of the present invention is to provide a hydropneumatic suspension system and a control method for same, which, in spite of being of a simple, inexpensive and repair-friendly structure, makes it possible to take account of both static and also dynamic factors and in addition permits both manual and also automatic control.

In this respect, the volumes of two respective mutually corresponding hydropneumatic springs at the front and the rear on the vehicle, that is to say in the case of a four-wheel vehicle, for example the left front and rear hydropneumatic springs of the vehicle, are coupled together. Besides the volumes of the two hydropneumatic springs involved, there is further the metering volume of a metering cylinder, wherein those three components are connected together by way of a load distribution unit which can assume three different switching positions:

connecting the volumes of the two hydropneumatic springs together and also to the metering cylinder,
connecting only the volumes of the two hydropneumatic springs to each other, and
separating the three component units from each other, that is to say separate action of each individual hydropneumatic spring.

In that arrangement, the metering volume of the metering cylinder is not a fixed volume but rather, by means of the metering cylinder, as required, an amount which is to be ascertained of metering volume is introduced into the system, that is to say into the coupled volume of the two hydropneumatic springs involved, or is removed by means of the metering cylinder.

The entire invention is described hereinafter in the form of a variation in the oil volume of the hydropneumatic springs involved and therewith also a metering volume of the metering cylinder in the form of hydraulic oil.

The variation in the oil volume of a hydropneumatic spring displaces the working point along the spring characteristic of the hydropneumatic spring upwardly, that is to say in the direction of a higher degree of prestressing.

Instead of the variation in the oil volume however, or supplemental to the variation in the oil volume, it is also possible to influence the gas volume, in which case the metering volume of the metering cylinder obviously also contains gas.

The for example increase in the gas volume of a hydropneumatic spring however—while maintaining the current working point—causes a displacement of the entire spring characteristic upwardly.

Independently thereof, the effects of the variation, which can be perceived on the vehicle, are not dissimilar so that the two options which are fundamentally afforded, that is to say influencing the oil volume and/or the gas volume of the hydropneumatic springs of a hydropneumatic suspension system, can certainly be used substitutively or in mutually supplemental relationship.

In addition to the three described switching positions of the load distribution unit the hydrodynamic connection of the two hydropneumatic springs has a compensating circuit which influences the nature of the transfer flow and likewise the connection of the metering cylinder to the two hydropneumatic springs has a metering circuit which also influences the nature of the transfer flow. The compensating circuit and the metering circuit provide for adaptation of the hydropneumatic suspension system to the dynamic parameters without using sensors and converting control or regulating elements.

The load distribution unit includes for example a non-return valve which permits a fast transfer flow from the rear to the front hydropneumatic spring, but blocks that in the opposite direction and can only be by-passed by way of a throttle so that a return flow can only take place at a much slower rate.

The metering circuit can be of an identical structure, with a passage direction from the metering cylinder to the hydropneumatic springs, but it includes at least one throttle which cannot be by-passed, in order to prevent an excessively rapid subsequent flow or discharge flow of metering volume out of the hydropneumatic springs.

In addition, it is possible to arrange in a by-pass in relation to the compensating circuit, a pressure-limiting valve disposed between the front hydropneumatic spring and the rear hydropneumatic spring or the metering cylinder respectively, which on the one hand serves as a safety valve for the front hydropneumatic spring (opening of the pressure-limiting valve at an excessively high pressure in the front hydropneumatic spring) and which on the other hand serves for the flow of metering volume from the metering cylinder directly into the front hydropneumatic spring, that is to say by-passing the throttles of the compensating circuit, in order to provide additional volume in the front hydropneumatic spring more quickly and thus to 'stiffen' the front hydropneumatic spring more quickly than the rear hydropneumatic spring.

Both measures serve to avoid the damage which occurs in the case of overloaded hydropneumatic suspensions almost always firstly at the front axles and thus steering arrangements of motor vehicles, and they also serve to be able to stiffen primarily the front hydropneumatic springs quickly and adequately, while in the case of the rear hydropneumatic springs that is generally still sufficient if a certain time delay is involved.

That affords the following options:

Travelling on smooth or relatively uneven ground with or without a slight gradient:

a) When the vehicle is uniformly loaded: the hydropneumatic springs are separated from each other; depending on the magnitude of the loading, prior to separation, metering volume is introduced to the required amount into the hydropneumatic springs when they are still connected together;

b) With an uneven loading: after the metering volume has been introduced into the coupled hydropneumatic springs, the connection to the metering cylinder is shut off and only the two hydropneumatic springs remain connected. That increases the working point for carrying the load, at the heavily loaded hydropneumatic spring.

Travelling on a moderate gradient:

Possibly after a metering volume has been introduced, the connection to the metering cylinder is shut off, but the hydropneumatic springs remain connected together in order particularly when travelling down a hill to be able to rapidly stiffen the heavily loaded front axle whenever a dynamic loading occurs.

Travelling on flat ground with a moderate frequency in terms of the occurrence of dynamic loadings due to irregularities of the ground, that is to say the speed of travel is not excessively high, in comparison with the distance between the irregularities in the ground:

In order to improve the level of travelling comfort the metering volume remains in flow communication with both hydropneumatic springs in order to increase the total available volume and to permit volume to flow to and back from the metering cylinder, in a manner which is limited in respect of speed but continuous.

High frequency in terms of the occurrence of dynamic loadings due to ground irregularities in relation to the speed of travel:

By virtue of the throttles in the compensating circuit and the metering circuit, a subsequent flow of volume from the metering circuit into the two hydropneumatic springs at the necessary speed in order to compensate for the dynamic loadings which occur is not possible in any case. Nonetheless the connection between the metering cylinder and/or the hydropneumatic springs remains open in order to permit at least a rapid return flow of volume from the first hydropneumatic spring if an excessively high pressure builds up there.

It may also be pointed out that the static factors include not only the loading of the vehicle but for example also the temperature, in particular in the gas of the hydropneumatic spring, which can be very different either by virtue of the external temperature or also by virtue of friction when the hydropneumatic spring is constantly extending and retracting, but the increase in temperature produces the same effect as an increase in the volume of gas, that is to say a displacement of the spring characteristic further upwardly, that is to say in the direction of a higher level of prestressing, and thus also requires compensation.

BRIEF DESCRIPTION OF THE DRAWINGS

An embodiment of the invention is described in greater detail with reference to the Figures in which.

BRIEF DESCRIPTION OF THE PREFERRED EMBODIMENTS

Figure 1:
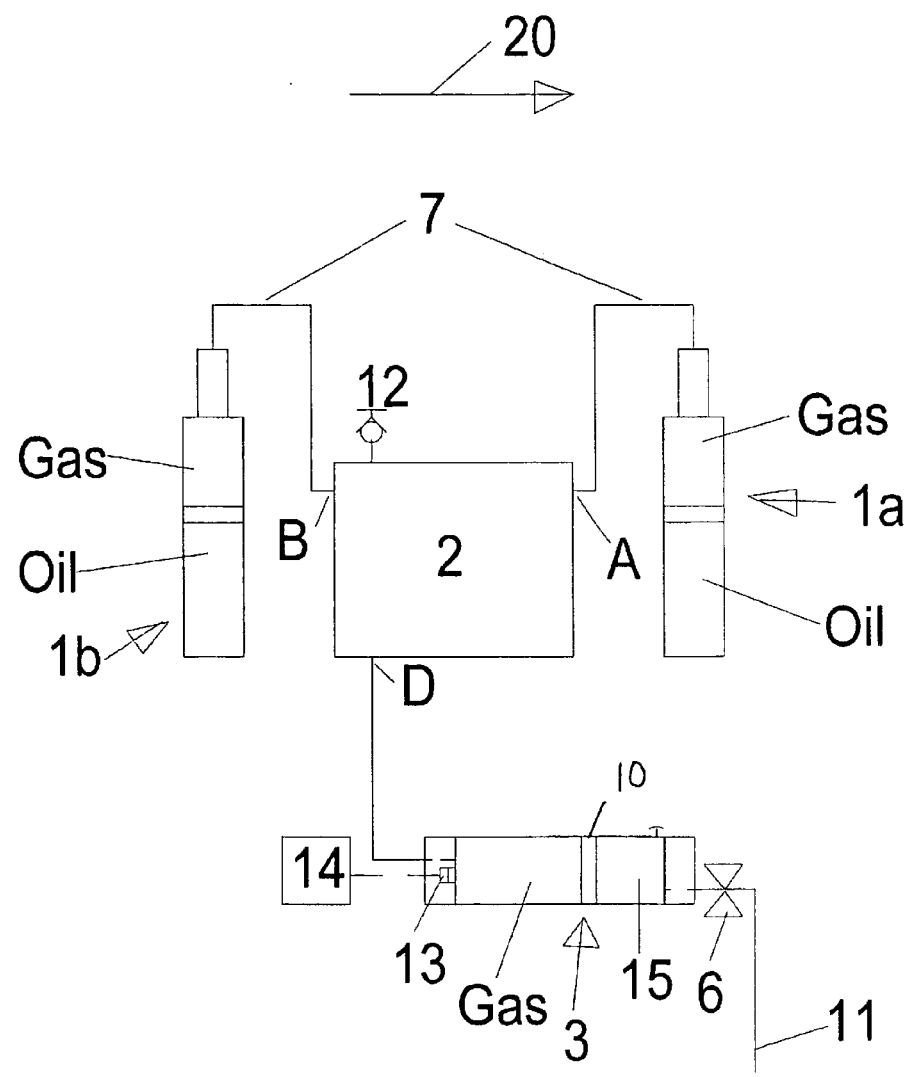
FIG. 1 is a circuit diagram showing the principle of the hydropneumatic suspension.

FIG. 1 shows the circuitry in principle of the components of the suspension according to the invention.

The hydropneumatic spring 1a which is at the front in the direction of travel 20 and the rear hydropneumatic spring 1b are in this arrangement each connected with their gas volume by way of compensating lines 7 to the load distribution unit 2 which is only symbolically illustrated, wherein the front hydropneumatic spring 1a is connected to the connection A and the rear hydropneumatic spring 1b is connected to the connection B.

The load distribution unit 2 also has a connection D which is connected to the metering volume 9 of a metering cylinder 3 which in this case is also a gas volume.

A metering plunger 10 is disposed in the metering cylinder 3 between the gas-filled metering volume 9 and the adjacent working chamber 15. By virtue of applying pressure in the working chamber 15 which can be connected to the working pressure 11 by way of a for example regulatable control valve 6, the pressure in the working chamber 15 can be controlled, that is to say increased or reduced, which results in a displacement of the metering plunger 10 and thus expels parts of the metering volume 9 out of the metering cylinder or allows them to flow back therein.

The pressure obtaining in the metering volume 9 is preferably checked by means of a pressure sensor 13 which is arranged thereon and which is in communication with a suitable testing device 14.

As is known the hydropneumatic springs 1a, 1b have a gas volume and an adjacent oil volume which are separated from each other by a diaphragm or a plunger in such a way that the relation of the gas volume to the oil volume within the total volume can alter, for example by virtue of compression of the gas volume.

The gas volume is loaded by the plunger rod to which the wheel (not shown) is secured.

In this respect it should again be pointed out that, instead of the gas volumes of the hydropneumatic springs 1a, 1b and the metering cylinder 3, the respective oil volumes thereof can also be connected to the load distribution unit and thus brought into communication with each other.

Figure 2:
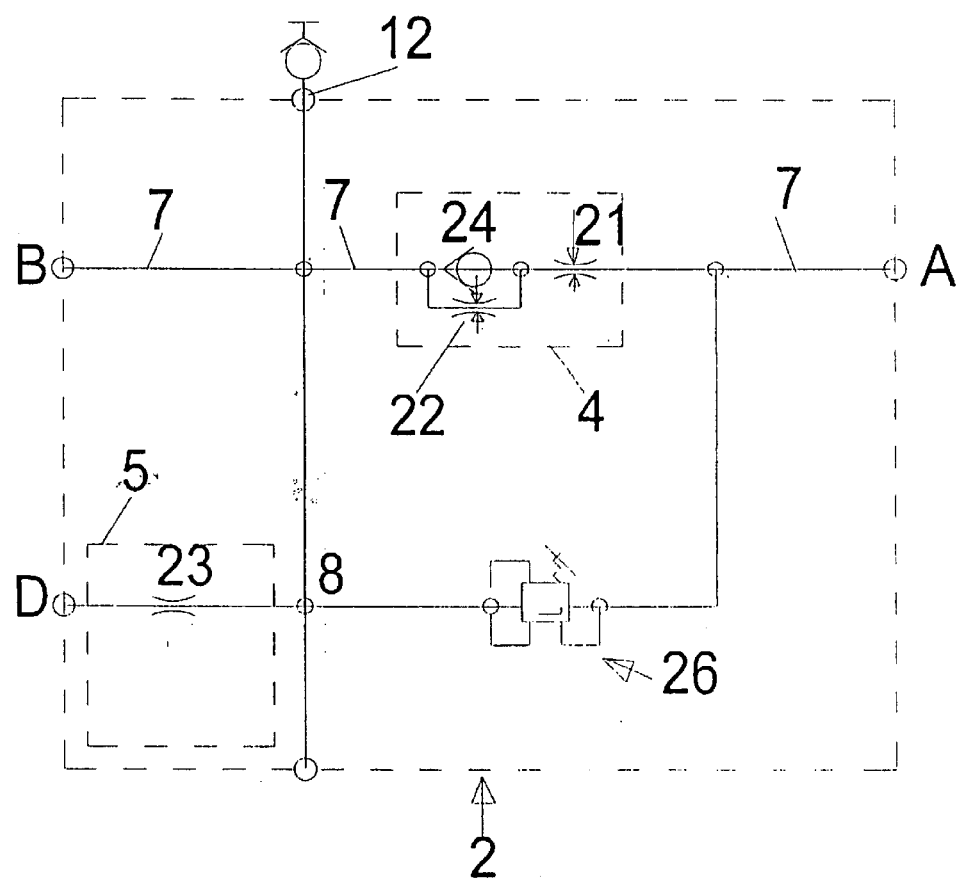
FIG. 2 shows the load distribution unit 2 of that suspension in the form of a block circuit diagram.

FIG. 2 shows the internal structure of the load distribution unit 2 in the form of a block circuit diagram. The two connections A and B for the hydropneumatic springs 1a, 1b are in communication with each other by way of a compensating circuit 4. It has on the one hand a non-return valve 24 through which a flow can pass in a direction towards the connection A, that is to say in the direction of the front hydropneumatic spring 1a, but which is closed in the opposite direction. Connected in series with the non-return valve 24 is a throttle 21 in the compensating line 7 between the connections A and B, which limits the through-flow in both directions of flow, to the degree of opening of that throttle 21. Connections A and B may be completely shut off by using valves that are standard in the industry.

In addition, arranged in parallel with the non-return valve 24 is a further throttle 22 whose opening diameter thus determines only the through-flow in the direction of flow from the connection A in the direction of the connection B or D, in which the non-return valve 24 is closed.

The arm of the compensating line 7 to the connection B, that is to say towards the rear hydropneumatic spring, is further connected to a metering circuit 5 which on the other hand is connected to the connection D for the metering cylinder 3. In the simplest case, that metering circuit 5 merely comprises a throttle 23 which limits the flow speed in both directions from or to the metering cylinder 3.

In addition, a pressure relief valve 26 is arranged between that metering circuit 5 and the arm of the compensating line 7, which is connected to the connection A, in such a way that, after the set pressure is exceeded, a through-flow from the connection A to the branch point 8 is possible. As the branch point 8 is arranged immediately upstream of the metering circuit 5 and is in communication with the arm of the compensating line 7, which is associated with the connection B, the fluid then flows both in the direction of the connection B and also through the metering circuit 5 to the connection D.

The pressure-relief valve 26 which is preferably adjustable in terms of its opposing pressure cannot in contrast allow a flow therethrough, in a direction towards the connection A.

That pressure-relief valve 26 thus serves primarily as a safety valve to prevent the gas volume of the hydropneumatic spring 1a connected to the terminal A coming under an excessively high pressure.

The load distribution unit 2 also has a filling connection 12 which is connected to the arm of the compensating line 7, which is associated with the connection B.

In the above-described cases, two respective hydropneumatic springs 1a, 1b, being a front one and a rear one, can be connected together and to a metering cylinder 3 by way of a compensating circuit 2.

When there are more than two hydropneumatic springs or axles which are arranged one behind the other, each two successive hydropneumatic springs can be connected together by means of a compensating circuit 2 as described above. In that case also each pair of hydropneumatic springs can be connected to a separate or a common metering cylinder 3, as described above.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

List of References
hydropneumatic spring
load distribution unit
metering cylinder
compensating circuit
metering circuit
control valve
compensating line
branch point
metering volume
metering plunger
working pressure
filling connection
pressure sensor
test device
working chamber
direction of travel
throttle
throttle
non-return valve
pressure-relief valve

What is claimed is:

1. A hydropneumatic, said suspension comprising:
   at least one front hydropneumatic spring and at least one rear hydropneumatic spring which are in flow communication with each other by way of a load distribution unit and also with a metering cylinder, wherein the load distribution unit having first and second connections has at least the following switching positions:
   a) flow separation of the hydropneumatic springs,
   b) flow communication only of the two connected hydropneumatic springs to each other, and
   c) flow communication of the two hydropneumatic springs and the metering cylinder to each other,
   the load distribution unit further having a compensating circuit having a first side and a second side in a compensating line having one side connected to the first hydropneumatic spring by means of said first connection and other side being connected to the second hydropneumatic spring at said second connection;
   a metering connection of the load distribution unit, which is in communication with the metering cylinder, is connected to both sides of the compensating line by way of the compensating circuit;
   a metering circuit is arranged between the metering connection of the load distribution unit and a branch point to both sides of the compensating line.

2. A hydropneumatic suspension according to claim 1 wherein a gas volume of each of said at least one front and rear hydropneumatic springs may be brought into communication with a gas-filled volume of said metering cylinder.

3. A hydropneumatic suspension according to claim 1 wherein the oil volumes of each of said at least one front and rear hydropneumatic springs may be brought into communication with the gas-filled volume of said metering cylinder.

4. A hydropneumatic suspension according to claim 1 wherein said compensating circuit has a throttle.

5. A hydropneumatic suspension according to claim 1 wherein a transfer flow from said second connection of said load distribution for said at least one rear hydropneumatic spring to said first connection of said load distribution of said at least one front hydropneumatic spring is possible more quickly than vice-versa.

6. A hydropneumatic suspension according to claim 4 wherein said compensating circuit has a non-return valve which is openable in a direction from said second connection of said load distribution for said at least one rear hydropneumatic spring towards said first connection of said load distribution for said at least one first front hydropneumatic spring and which is connected in series with said throttle.

7. A hydropneumatic suspension according to claim 6 wherein a further throttle is connected in said compensating circuit in by-pass relationship with said non-return valve.

8. A hydropneumatic suspension according to claim 1 wherein said metering circuit of said load distribution unit is of an identical structure to said compensating circuit.

9. A hydropneumatic suspension according to claim 1 wherein said metering circuit includes at least one throttle.

10. A hydropneumatic suspension according to claim 1 wherein a pressure-relief valve is arranged between said metering circuit and the side of said compensating line which is connected to said first connection of said load, with an excessively high pressure on the side of said first connection, opening is possible with diversion to said at least one branch point between said metering connection and said second connection.

11. A hydropneumatic suspension according to claim 1 wherein said metering connection may be completely shut off.

12. A hydropneumatic suspension according to claim 1 wherein said first and second connections may be completely shut off.

13. A hydropneumatic suspension according to claim 1 wherein said metering cylinder has a metering plunger which actuation of on the side which is remote from the metering volume may be determined automatically by the vehicle control system.

14. A method of controlling a hydropneumatic having a plurality of hydropneumatic springs which can be brought into direct flow communication with each other and also with a metering cylinder, said method comprising the steps of:
  a) with low dynamic influences, in dependence on static factors, fluid is introduced from the metering cylinder into an assembly, which includes the hydropneumatic springs being in direct flow communication, and thereafter the hydropneumatic springs are separated from each other in respect of flow;
  b) in the case of moderate dynamic influences, in dependence on static factors, fluid is added from the metering cylinder into an assembly which includes the hydropneumatic springs being in direct flow communication and the connection between the two hydropneumatic springs and also the connection to the metering cylinder remains open; and
  c) in the case of heavy dynamic influences, fluid is introduced from the metering cylinder into an assembly which includes the hydropneumatic springs and the connection between the hydropneumatic springs being in direct flow communication and the metering volume remains open, but a rapid transfer flow between the two hydropneumatic springs or between the hydropneumatic springs and the metering cylinder is prevented.

15. A method according to claim 14 wherein a static factor is the load state of the vehicle.

16. A method according to claim 1 wherein a static factor is the temperature of the gas in the suspension.

17. A hydropneumatic suspension for motor vehicles, said suspension comprising:
  a compensating line having at least two arms, at least two connections, and at least one branch point;
  at least one front hydropneumatic spring in flow communication with at least one rear hydropneumatic spring;
  a metering cylinder in flow communication with said at least one front hydropneumatic spring and said at least one rear hydropneumatic spring;
  a load distribution having first and second connections in flow communication with said at least one front and said rear hydropneumatic springs including:
    at least one metering connection being connected to said both arms of said compensating line and communication with said metering cylinder,
    switching positions for flow separation of said at least one front and at least one rear hydropneumatic springs, for flow communication only of said at least one front and at least one rear hydropneumatic springs to each other, and for flow communication of said at least one front and at least one rear hydropneumatic spring and said metering cylinder to each other,
  a compensating circuit without sensors and electrical or electronic control or regulating elements for converting signals thereof being in said compensating line between said at least two connections of said compensating line;
  a metering circuit being arranged between a metering connection and said branch point to the arms of said compensating line and being without sensors and electrical or electronic control or regulating elements for converting signals thereof.

18. A hydropneumatic suspension according to claim 1 wherein said metering cylinder has a metering plunger which actuation of on the side which is remote from the metering volume may be determined manually by the vehicle control system.

19. A hydropneumatic suspension according to claim 1 wherein said metering circuit of said load distribution unit is of an identical structure to said compensating circuit with an opening direction of a non-return valve from said metering connection to said compensating line.

20. A hydropneumatic suspension according to claim 1 wherein said suspension is for motor vehicles.

21. A method according to claim 14 wherein the hydropneumatic suspension is for a motor vehicle.

22. A method of controlling a hydropneumatic having a plurality of hydropneumatic springs which can be brought into direct flow communication with each other and also with a metering cylinder, said method comprising the steps of:
  a) with low dynamic influences, in dependence on static factors, fluid is introduced from the metering cylinder into an assembly, which includes the hydropneumatic springs being in direct flow communication, and thereafter the hydropneumatic springs are separated from each other in respect of flow;
  b) in the case of moderate dynamic influences, in dependence on static factors, fluid is added from the metering cylinder into an assembly which includes the hydropneumatic springs being in direct flow communication and the connection between the two hydropneumatic springs and also the connection to the metering cylinder remains open;
  c) in the case of heavy dynamic influences, fluid is introduced from the metering cylinder into an assembly which includes the hydropneumatic springs and the connection between the hydropneumatic springs being in direct flow communication and the metering volume remains open, but a rapid transfer flow between the two hydropneumatic springs or between the hydropneumatic springs and the metering cylinder is prevented; and
  d) in the case of high dynamic loadings a fast return flow from the front hydropneumatic spring is possible by way of opening of the pressure-relief valve into the rear hydropneumatic spring without passing through a throttle.

23. A method of controlling a hydropneumatic having a plurality of hydropneumatic springs which can be brought into direct flow communication with each other and also with a metering cylinder, said method comprising the steps of:
   a) with low dynamic influences, in dependence on static factors, fluid is introduced from the metering cylinder into an assembly, which includes the hydropneumatic springs being in direct flow communication, and thereafter the hydropneumatic springs are separated from each other in respect of flow;
   b) in the case of moderate dynamic influences, in dependence on static factors, fluid is added from the metering cylinder into an assembly which includes the hydropneumatic springs being in direct flow communication and the connection between the two hydropneumatic springs and also the connection to the metering cylinder remains open;
   c) in the case of heavy dynamic influences, fluid is introduced from the metering cylinder into an assembly which includes the hydropneumatic springs and the connection between the hydropneumatic springs being in direct flow communication and the metering volume remains open, but a rapid transfer flow between the two hydropneumatic springs or between the hydropneumatic springs and the metering cylinder is prevented; and
   d) in the case of high dynamic loadings a fast return flow from the front hydropneumatic spring is possible by way of opening of the pressure-relief valve into said metering cylinder without passing through a throttle.

* * * * *